United States Patent
Baugh et al.

(10) Patent No.: US 11,639,642 B2
(45) Date of Patent: May 2, 2023

(54) REMOTELY ACTIVATED CONNECTION DEVICE FOR A SPIRAL SHOULDER CONNECTION

(71) Applicant: Reel Power Licensing Corp., Oklahoma City, OK (US)

(72) Inventors: Benton Frederick Baugh, Houston, TX (US); Stephanie Tritchler, Houston, TX (US); Christopher David Rekieta, Houston, TX (US)

(73) Assignee: Reel Power Licensing Corp., Oklahoma City, OK (US)

(*) Notice: Subject to any disclaimer, the term of this patent is extended or adjusted under 35 U.S.C. 154(b) by 0 days.

(21) Appl. No.: 17/177,428

(22) Filed: Feb. 17, 2021

(65) Prior Publication Data

US 2021/0172276 A1 Jun. 10, 2021

Related U.S. Application Data

(63) Continuation of application No. 16/458,565, filed on Jul. 1, 2019, now abandoned, which is a continuation-in-part of application No. 16/216,288, filed on Dec. 11, 2018, now abandoned, which is a continuation-in-part of application No. 15/918,509, filed on Mar. 12, 2018, now abandoned.

(60) Provisional application No. 62/697,670, filed on Jul. 13, 2018, provisional application No. 62/607,519, filed on Dec. 19, 2017, provisional application No. 62/471,015, filed on Mar. 14, 2017.

(51) Int. Cl.
B23P 19/04 (2006.01)
E21B 33/038 (2006.01)
E21B 17/02 (2006.01)
F16L 37/00 (2006.01)

(52) U.S. Cl.
CPC ........... *E21B 33/038* (2013.01); *B23P 19/04* (2013.01); *E21B 17/02* (2013.01); *F16L 37/002* (2013.01)

(58) Field of Classification Search
CPC ....... E21B 33/038; E21B 17/02; F16L 37/002
See application file for complete search history.

(56) References Cited

U.S. PATENT DOCUMENTS

| | | | |
|---|---|---|---|
| 3,096,999 A | 7/1963 | Ahlstone et al. | |
| 3,321,217 A | 5/1967 | Ahlstone | |
| 4,516,795 A | 5/1985 | Baugh | |
| 4,699,215 A | 10/1987 | Cuiper | |
| 5,332,043 A | 7/1994 | Ferguson | |
| 5,522,681 A * | 6/1996 | Pallini, Jr. ............. | B63B 21/502 166/345 |
| 6,609,734 B1 | 8/2003 | Baugh | |
| 7,686,087 B2 | 3/2010 | Pallini et al. | |
| 8,490,706 B2 | 7/2013 | Rodgers | |
| 2009/0102182 A1 | 4/2009 | Gazewood | |
| 2010/0288503 A1 | 11/2010 | Cuiper et al. | |
| 2011/0227336 A1 | 9/2011 | Mogedal et al. | |

\* cited by examiner

*Primary Examiner* — Nirvana Deonauth
(74) *Attorney, Agent, or Firm* — Phillips Murrah PC; Martin G. Ozinga

(57) ABSTRACT

The invention provides a remotely activated connecting device for connecting a wellhead and or Christmas tree positioned on a wellhead to a fracing tree that may comprise a collet system for selectively engaging and disengaging from a threaded, spiral, and or flange shoulder that may utilize hydraulics for same.

1 Claim, 18 Drawing Sheets

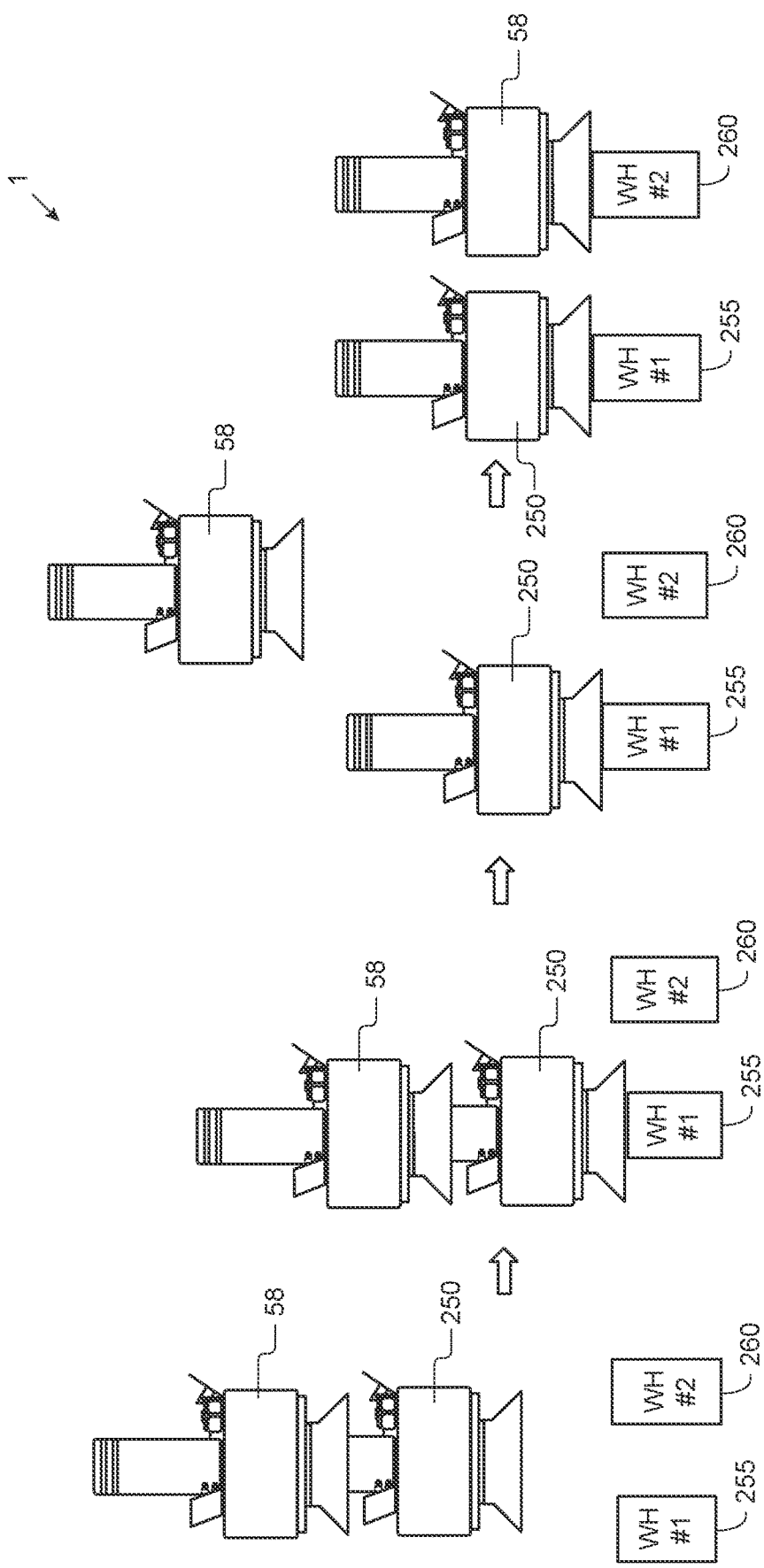

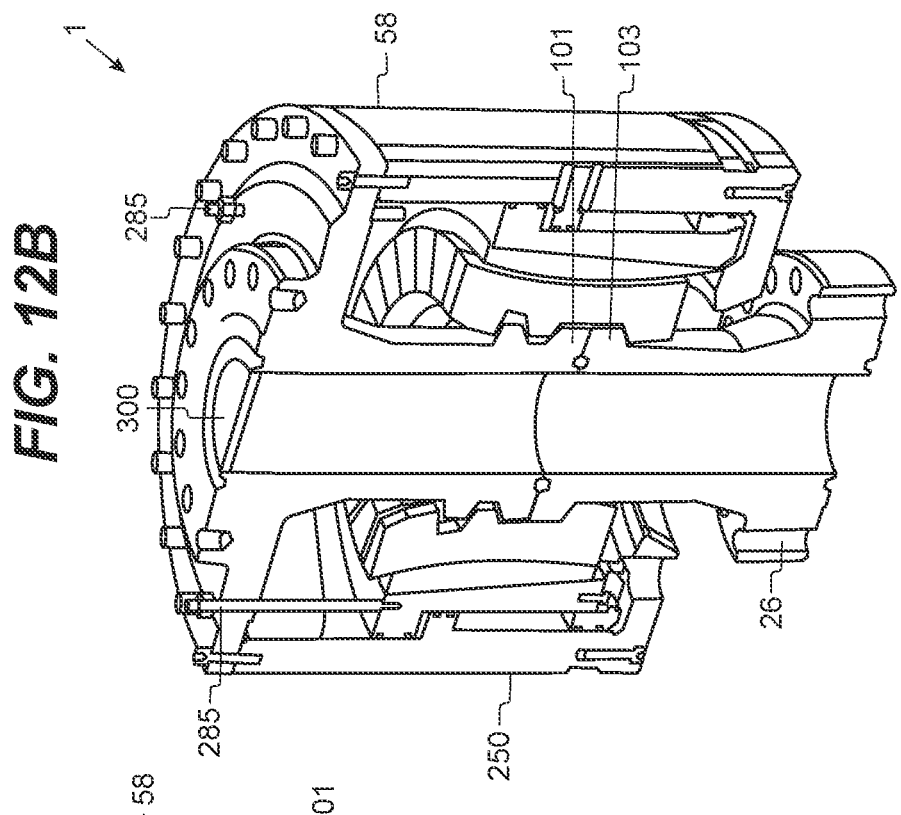
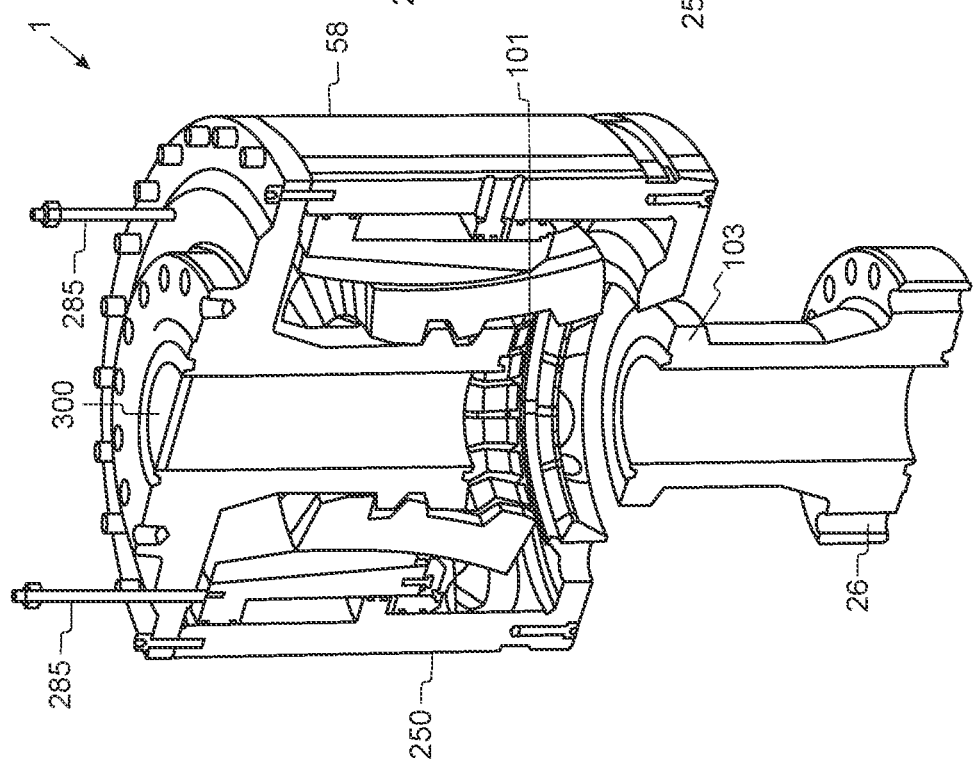

REMOTELY ACTIVATED CONNECTION DEVICE FOR A SPIRAL SHOULDER CONNECTION

CROSS-REFERENCE TO RELATED APPLICATIONS

This application is a continuation of U.S. patent application Ser. No. 16/458,565, filed on Jul. 1, 2019, currently pending, which claims the benefit of U.S. Provisional Patent Application Ser. No. 62/697,670, filed on Jul. 13, 2018. U.S. patent application Ser. No. 16/458,565 is also a continuation-in-part of U.S. patent application Ser. No. 16/216,288, filed on Dec. 11, 2018, now abandoned, which claims benefit of U.S. Provisional Patent Application Ser. No. 62/607,519, filed on Dec. 19, 2017. U.S. patent application Ser. No. 16/458,565 is also a continuation-in-part of U.S. patent application Ser. No. 15/918,509, filed on Mar. 12, 2018, now abandoned, which claims benefit of U.S. Provisional Patent Application Ser. No. 62/471,015, filed on Mar. 14, 2017. The entire content of each of the above-referenced applications is hereby expressly incorporated herein by reference.

BACKGROUND OF INVENTION

1. Field of the Invention

In general, the present invention relates to a device, system, and method for remotely connecting to a threaded profile member. More particularly, the present invention provides for remotely connecting such as but not limited to a service tool package to a Christmas tree utilizing a spiral shoulder such as but not limited to an Acme thread. It is also contemplated to provide a remotely actuated connector for hydraulic fracturing that may feature a remote blind connection, night cap, and or plug. Furthermore, it is contemplated to provide a funnel down connector that may be utilized on wells via an on-site crane with wells that do not have a connector.

2. Description of the Prior Art

The ability to make a mechanical connection between two members has had many varied methods including tying them together with ropes, a threaded connection, welding, gluing, friction, and a collet type connection. Of these, the collet type is the most amenable to being remotely connected. The collet type generally means that one of the members collapses or expands to engage the other member. Collet type connectors can be generally divided into two categories, straight diameter and shouldered. Straight diameter collets are used in numerous applications such as machine tools to engage round work pieces, as chucks for pencil lead, and collapsible pressure fittings around tubing.

Shouldered collets are generally used in application requiring both a high axial load between the two connected members and repeated connections and disconnections. The torus type connector shown in U.S. Pat. No. 6,609,734 is an example of this type of connector, which is for connecting a subsea blowout preventer stack to a subsea wellhead. It must be done repeatedly remotely and as they are typically 18¾" bore×10,000 P.S.I. working pressure units, the axial loading is in excess of three million pounds. On these units, the collets or locking segments (61) are pushed radially onto shoulders or hubs 10, 11, and 51. The mating surfaces such as 53 are typically on a twenty-five degree angle and are conical in shape. The conical shapes on both the hubs and the collets or locking segments provide a large area of contact to withstand the high axial loadings.

Similar connectors such as shown in U.S. Pat. No. 3,096,999 have the dogs 34 driven inwardly by the conical inner surface 28a of ring 28 such that when an outward force on tapered shoulders 36 and 38 is generated on the dogs 34 by the centerline tensioning caused by bore pressure, the ring 28 is urged in the unintended released position. U.S. Pat. No. 4,516,795 compensates for this by substituting a torus driver shoe R for the conical inner surface, allowing the potential releasing forces to be canceled. This patent moves to a force balanced position and travels a little further such that the forces tend to lock it more against a shoulder, or functionally locking it over center much like a typical light switch does.

Another type of situation exists on land wellheads where the upper connection of the valves atop the wellhead or the Christmas tree typically has an Acme thread for connection. The Acme thread profile is a relatively rugged thread construction and the most common profile used is four threads per inch. When the two members are brought together, the nut member of the tree cap is simply manually screwed onto the male threaded tree cap.

This procedure has long required the direct intervention of a person when landing heavy equipment loads of service equipment, such as a blowout preventer stack and a coiled tubing unit, onto the top of a Christmas tree for servicing. The coiled tubing unit is a tractor type mechanism, which will lower a string of coiled tubing coming from a reel into the well. This assembly can easily weigh 20,000 lbs.

This procedure has been complicated by the addition of landing large assemblies of valves called fracking trees onto the top of the Christmas tree, and then landing the other service equipment onto the top of the fracking trees. At this time, the need for the remote connection can be more than twenty feet into the air. To further complicate this, the area around the Christmas tree can be a restricted area due to the nature of the fracking operations on adjacent Christmas trees.

Thus, there is a need for an apparatus, process, and or system that provides quick and reliable means for securing equipment such as but not limited to a service tool package to a Christmas tree previously attached to a wellhead. The above discussed limitations in the prior art is not exhaustive. The current invention provides an inexpensive, time saving, more reliable apparatus, method and system where the prior art fails.

Furthermore, it is understood that fracturing operations, also referred to as fracing or fracking, are in need of quick connection during repetitive operations. Fracturing operations involve sending a perforating device down hole to create holes in a specific zone. The wireline BOP must be removed after perforating each zone. It is desirable to provide a seal or plug referred to as a "night cap" to the top of the frac tree on the top of the well when the wireline BOP is not connected. Due to the high pressure fluid being pumped to perform the operations, there are obvious safety concerns. The night caps can provide a redundant pressure containing device in place while fracking the well. Current night caps are manually connected. It is not unusual for this process to be performed 30 to 50 times in a single well and 100 to 300 times per well pad. There is a need to provide a fast and safe connection during this repetitive process.

SUMMARY OF THE INVENTION

In view of the foregoing disadvantages inherent in the known types of conventional connections now present in the prior art, the present invention provides a new and improved apparatus, system, and method of use that provides faster and safe performance. As such, the general purpose of the present invention, which will be described subsequently in greater detail, is to provide a new and improved hydraulic connector for use with a wellhead and or Christmas tree previously attached to a wellhead, which has all the advantages of the prior art devices and none of the disadvantages.

It is, therefore, contemplated that the present invention is an apparatus, system, and method of connecting a connecting member to a threaded profile member, comprising one or more segments with a female threaded profile, holding said segments out of engagement from said threaded profile member while engaging said connecting member with said threaded profile member, releasing said one or more segments to allow engagement with said threaded profile member, moving said one or more segments axially of said threaded profile member to allow the threads of said segments to engage the threads of said threaded profile member, causing said threads of said segments to engage said threads of said threaded profile member, securing said segments in the engaged position and so forth.

It is also contemplated to provide a sealing means for fracking operations wherein the top of the connecter may have a seal and or plug attached. It is also contemplated that the connector may not have a fully bored out annulus and or through port thereby forming a seal after the connection is made. It is contemplated to use one of our remote connectors to pick up and move another remote connector without a through port for creating a night cap. The invention may provide an automatic and remote blind connection. It may also include a remote ball drop, bore pressure monitoring, and or a control interlock for pressure.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved remotely activated connector apparatus, system, and method for use with a wellhead and or Christmas tree previously installed on a wellhead to other equipment such as but not limited to a fracking tree.

Furthermore, an object of the present invention is to provide a new and improved remotely activated connector apparatus, system, and method, which provides shouldered collets that collapses to engage a threaded member and expands to disengage the threaded member by use of but not limited to hydraulic pressure allowing for remote connecting and disengaging thereby eliminating a worker from manually doing same and making these operations much safer.

Another object of the present invention is to provide a new and improved remotely activated connector, which may provide a hands free connection without requiring orientation of the members being connected.

It is a further object of the present invention to provide a new and improved remotely activated connector apparatus, system, and method, which is of a durable and reliable construction and may be utilized in numerous types of wellhead applications and or Christmas tree applications.

An even further object of the present invention is to provide a new and improved remotely activated connector apparatus, system, and method, which is susceptible to a low cost of installation and labor, which accordingly is then susceptible to low prices of sale to the consuming industry, thereby making such a system economically available to those in the field.

Still another object of the present invention is to provide a new and improved remotely activated connector, which provides all of the advantages of the prior art while simultaneously overcoming some of the disadvantages normally associated therewith.

It is a still further object of the present invention to provide a new and improved remotely activated connector apparatus, system, and method, which may include a seal, plug, night cap, and so forth that may be utilized in fracking operations where it is desirable to have an automatic and remote blind connection.

It is a further object of the present invention to provide a new and improved remotely activated connector apparatus, system, and method, which may provide a funnel down approach and or a funnel down attachment, which may reduce the need of connectors being provided on the wellheads in a pad with multiple wells.

These, together with other objects of the invention, along with the various features of novelty, which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE PICTORIAL ILLUSTRATIONS, GRAPHS, DRAWINGS, AND APPENDICES

The invention will be better understood and objects other than those set forth above will become apparent when consideration is given to the following detailed description thereof. Such description makes reference to the annexed pictorial illustrations, graphs, drawings and appendices.

FIG. 10A is generally an illustration of another preferred embodiment in accordance with the current invention showing the steps of an operation and or method.

FIG. 10B is generally an illustration of another preferred embodiment in accordance with the current invention showing the steps of an operation and or method.

FIG. 10C is generally an illustration of another preferred embodiment in accordance with the current invention showing the steps of an operation and or method.

FIG. 10D is generally an illustration of another preferred embodiment in accordance with the current invention showing the steps of an operation and or method.

FIG. 12A is generally an illustration of another preferred embodiment in accordance with the current invention showing a cross section in the unlocked position.

FIG. 12B is generally an illustration of another preferred embodiment in accordance with the current invention showing a cross section in the locked position.

DETAILED DESCRIPTION OF INVENTION

Figures 1, 2:
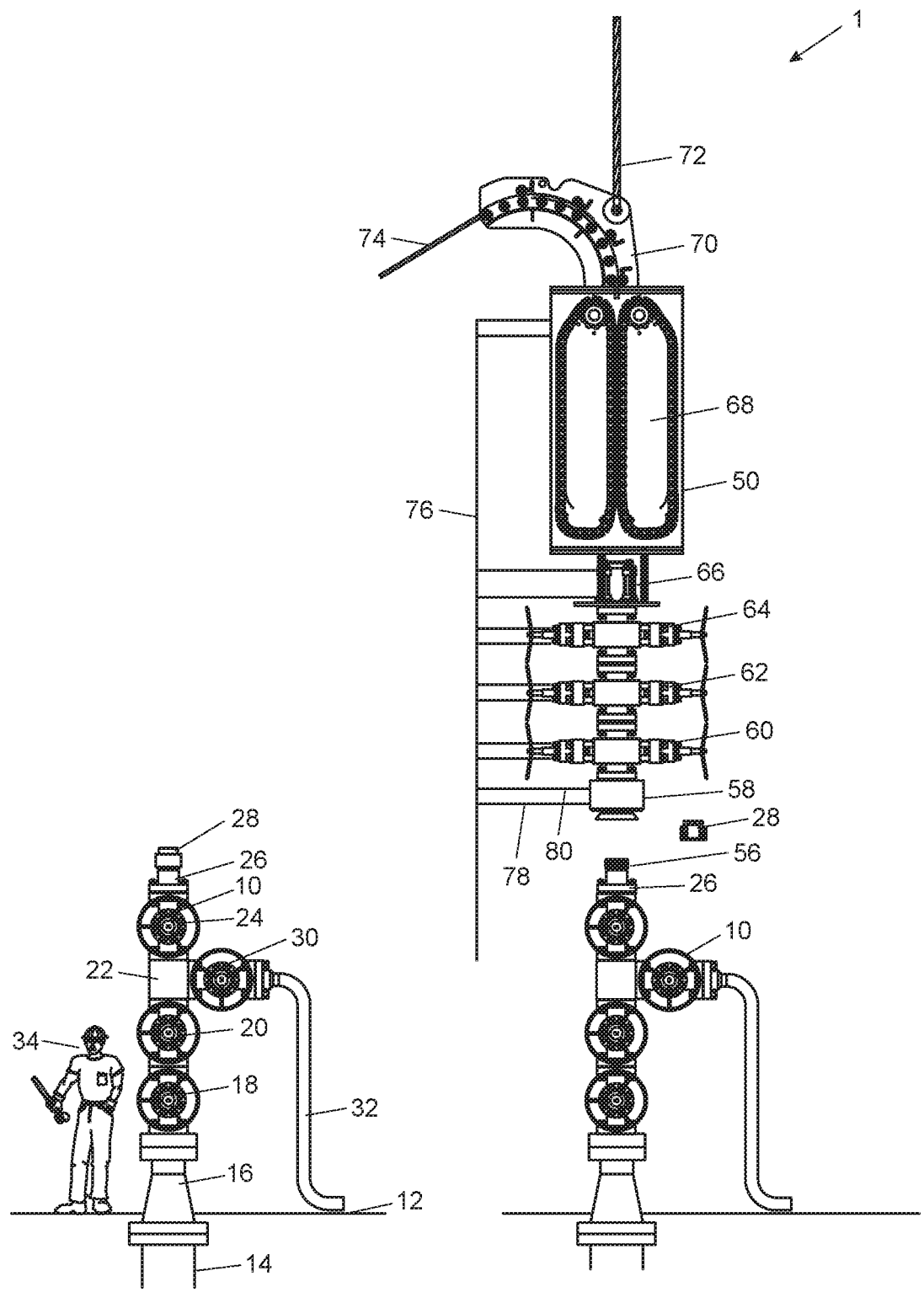
FIG. 1 is generally a side view of a Christmas tree in accordance with a preferred embodiment of the current invention.
FIG. 2 is generally a side view of a service tool package being landed on the Christmas tree of FIG. 1 in accordance with a preferred embodiment of the current invention.

Referring to the illustrations, drawings, and pictures, and to FIGS. 1 and 2 in particular, reference character 1 generally designates a new and improved hydraulically activated connector in accordance with the present invention. Invention 1 is generally used in oil and gas well operations and may be utilized in other operations not associated with oil and gas operations. For purposes of convenience, the reference numeral 1 may generally be utilized for the indication of the invention, portion of the invention, preferred embodiments of the invention and so on. It is also to be understood that invention 1 should not be considered limited to just a "remotely activated connection device for a spiral shoulder connection" and the term should not be considered to limit the invention to such.

Referring now to FIG. 1, Christmas tree 10 is shown above a surface 12, which can be land or the deck of a platform. Wellhead 14 suspends the casing (cemented pipe) within an oil or gas well, tubing spool 16 suspends the tubing (removable pipe) within the well, master valves 18 and 20, which are the primary safety control, tee 22, which provides a production outlet, a swab valve 24 to open the well for servicing, a male profile and or top sub 26, tree cap 28 as the connection at the top, and wing valve 30 to open production flow into pipeline 32. A man 34 is shown for an illustration of the general size of the components.

Referring now to FIG. 2, service tool package 50 is shown being landed on Christmas tree 10. It is understood that service tool package may be of numerous types and but not limited to a wireline BOP. Tree cap 28 has been removed from male profile and or tree cap 28 top sub 26, leaving a male thread 56 exposed for engaging. Connecting member and or connector 58 is at the bottom of the service tool package 50 and utilizes the features of this invention to engage the male thread 56 of top sub 26. Blowout preventers 60, 62 and 64, safety slips 66 for emergency stop of coiled tubing 74, coiled tubing 74 injector head 68, multi-roller sheave 70, crane lifting line 72, and the coiled tubing 74 are shown. Multi-line control umbilical 76 is shown with lines 78 and 80 connecting to various components. Line 78 serves to lock connector 58 and line 80 serves to unlock connector 58 remotely.

The FIGS. 1 and 2 spacing between the Christmas trees 10 is illustrious of the actual spacing of Christmas trees such that when multiple Christmas trees are being serviced different operations will require repeated moving of the service tool package 50 between the Christmas trees 10 by the crane lifting line 72. Additionally, the size of the service components is understood by the comparison to the size of the man 34. Blowout preventers 60, 62, and 64 are shown for illustration, however, a fracking tree several times the size of the blowout preventers and strippers generally smaller than the blowout preventers may also be required. Logging may also be required in which a tall chamber holding logging tools may need to be landed on the top of the blowout preventers to do downhole logging or analysis of the formations. Clearly, there is a need for a remote connection at the top of the Christmas tree rather than having a person climb up to make up a threaded connection or remove it repeatedly to make up a flanged connection.

Figure 3A:
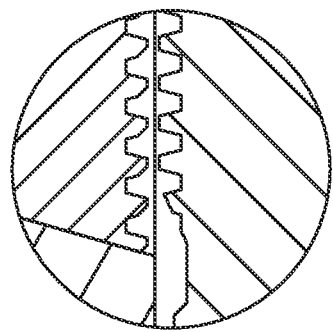
FIG. 3A is generally an enlarged portion of FIG. 3 showing the thread profile engagement in accordance with a preferred embodiment of the current invention.
Figure 3:
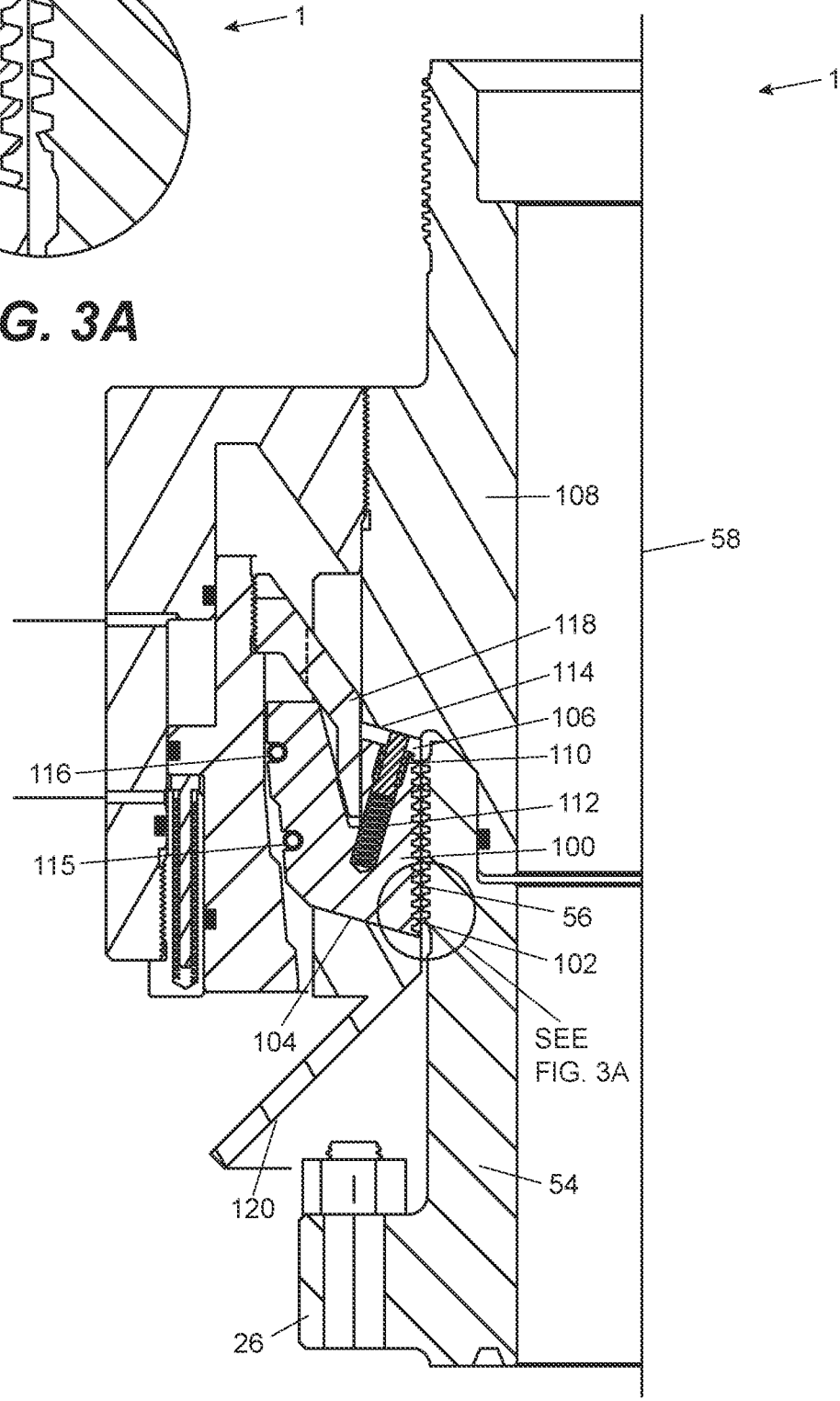
FIG. 3 is generally a half cross section of the connector in the unlocked position in accordance with a preferred embodiment of the current invention.

Referring now to FIG. 3, connecting member and or connector 58 is shown having dog segments 100 with threads 102 ready to engage the threads 56 of top sub 26. It is understood that other connections may utilize other types of male female connectors and or profiles on dog segments 100 such as groove and or grooves 101 depicted to be mated with flange and or flanges 103 in FIG. 12A and FIG. 12B.

Dog segments 100 are sitting on inclined shoulder 104 of window 106 of main body 108. The angle of the inclined shoulder 104 is slightly greater than the angle of the threads 56, as will be discussed later. Pin 110 is extended by spring 112 to or near to surface 114 in window 106 of body 108 to keep the segments 100 adjacent to inclined shoulder 104 until pushed out of position. Garter springs 115 and 116 urge threads 102 on dog segments 100 into engagement with threads 56 on top sub 26, but movement of dog segments 100 is presently retrained by tang portion 118. Body 108 also has a funnel down and or funnel down attachment 120 at its lower end to assist in guiding the connector 58 into engagement with top sub 26.

Referring now to FIG. 3A, and enlarged view of the thread profile position at this time is shown.

Figures 4, 4A:
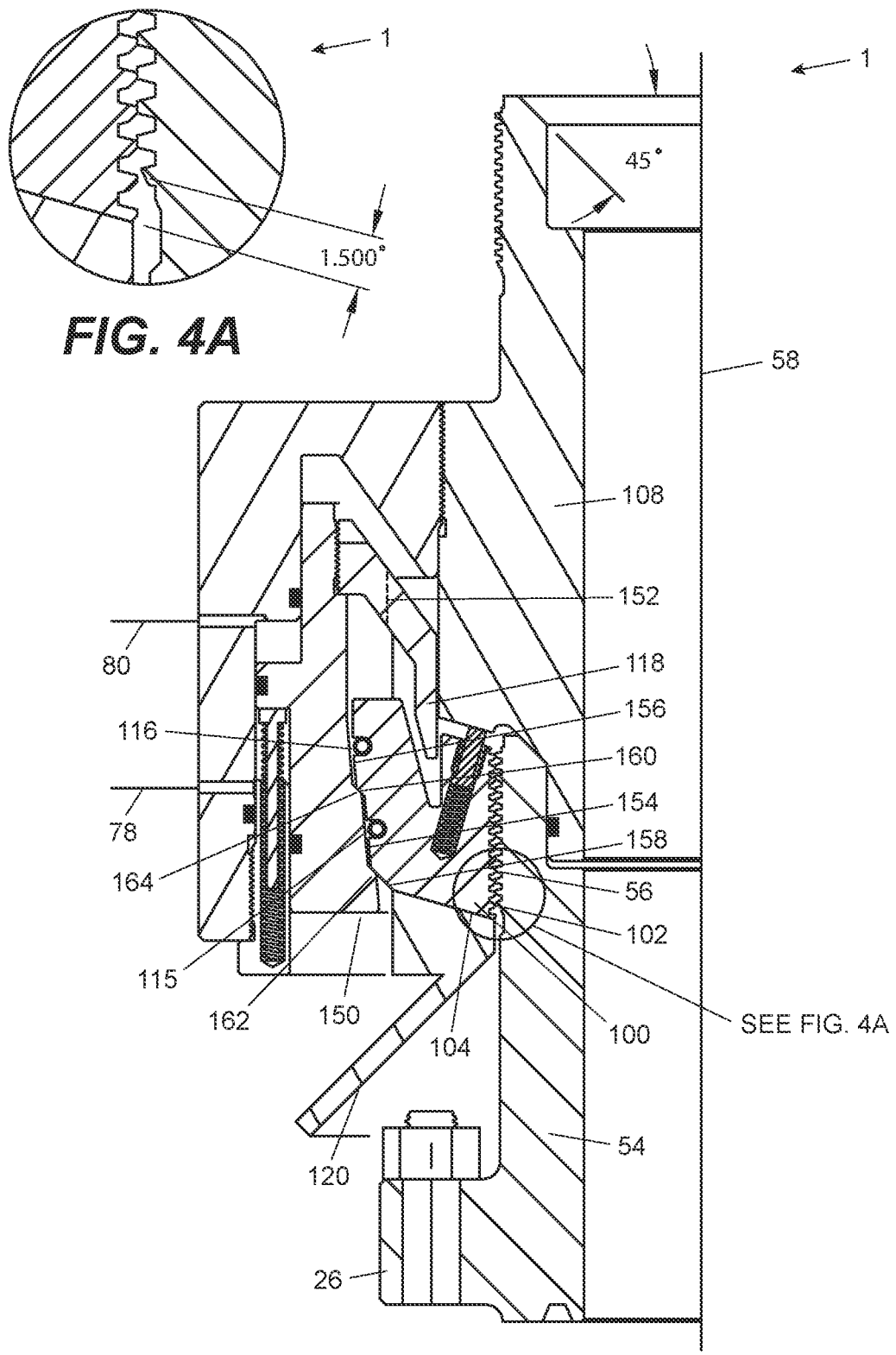
FIG. 4 is generally a half cross section of the connector in the partially locked position in accordance with a preferred embodiment of the current invention.
FIG. 4A is generally an enlarged portion of FIG. 4 showing the thread profile engagement in accordance with a preferred embodiment of the current invention.

Referring now to FIG. 4, flow and pressure have been introduced through line 78 to start moving piston 150 up and it takes tang body 152 and its tang portion 118. As this happens, dog segments 100 are free to be moved inwardly by garter springs 115 and 116 and threads 102 engage threads 56. As there is no orientation between the threads 102 and 56, there is a low chance that the threads may engage perfectly, but it is highly likely they will not. As Acme threads have a large flat area on the top, they are most likely to simply land flat on flat. The one thing you do not want to happen is for the threads 102 to move in radially and partially engage threads 56. In order to prevent this the angle of inclined shoulder 104 is slightly more than the angle of the side of the Acme thread so that if engagement starts, it will be complete engagement. Acme threads have a fourteen and one half degree side angle, so the angle of the inclined shoulder 104 would be about sixteen degrees.

Referring now to FIG. 4A, and enlarged view of the thread profile position at this time is shown, illustrating the one and one half degree difference.

Dog segment 100 provides dual outside tapers, shallow tapers 154 and 156 and steeper tapers 158 and 160. As the piston 150 moves to this position, the shallow tapers 154 and 156 are not engaged, but rather the steeper tapers 158 and 160 are engaged by mating shoulders 162 and 164. These angles are at approximately forty-five degrees and so are as likely to push the dog segments 100 upwardly as inwardly. As piston 150 continues to move upwardly, the threads 102 will slide on the top of the threads 56 until they are properly engaged and then the combination of the garter springs 115 and 116 and steeper tapers 158 and 160 will move threads 102 into full engagement with threads 56.

Figure 5A:
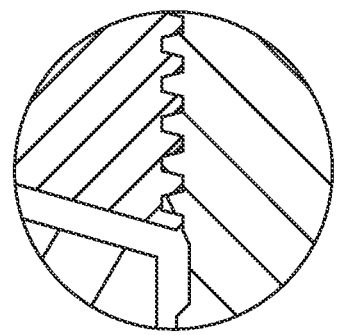
FIG. 5A is generally an enlarged portion of FIG. 5 showing the thread profile engagement in accordance with a preferred embodiment of the current invention.
Figure 5:
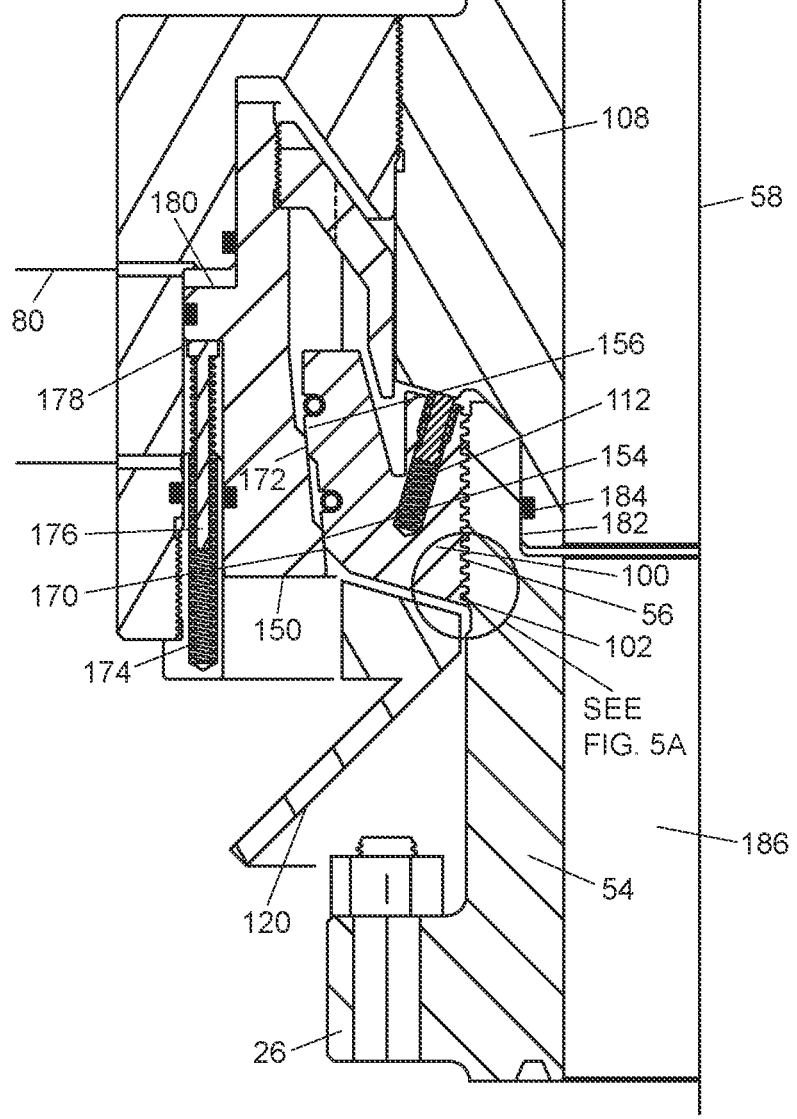
FIG. 5 is generally a half cross section of the connector in the locked position in accordance with a preferred embodiment of the current invention.

Referring now to FIG. 5, piston 150 has continued to travel up until shallow tapers 154 and 156 are engaged by shallow tapers 170 and 172 tending to friction lock the piston 150 in position. In this movement as dog segment 100 has been moved up, spring 112 has been compressed by the upward movement of piston 150. Springs 174 and plungers 176 are extended against shoulder 178 of piston 150 with enough spring load to prevent the piston 150 from falling back to disengage the dog segments 100 from the threads 56. When pressure in introduced into line 80, the larger piston area of shoulder 180 when compared to the piston area of shoulder 178 will insure the unlocking and overriding of the springs 174 to release the connector.

Interface 182 between main body 108 and tree cap 28 top sub 26 is sealed by seal 184 such that when pressure is introduced into bore 186 an axial separation force is imposed on main body 108 and tree cap 28 top sub 26, which is resisted by male thread 56, threads 102, and inclined shoulder 104. With a conventional Acme thread application with its fourteen and one half degree angles, an outward force is generated towards piston 150 tending to drive it to the unintended release position. With the angle of the inclined shoulder 104 being greater than the engagement angle on the Acme threads (as seen in FIG. 4A), the net force direction is towards the centerline of the parts rather than outward or away from the centerline. This achieves the desired "lock over center" characteristic of the connector.

Referring now to FIG. 5A, an enlarged view of the thread profile position at this time is shown.

Figure 6:
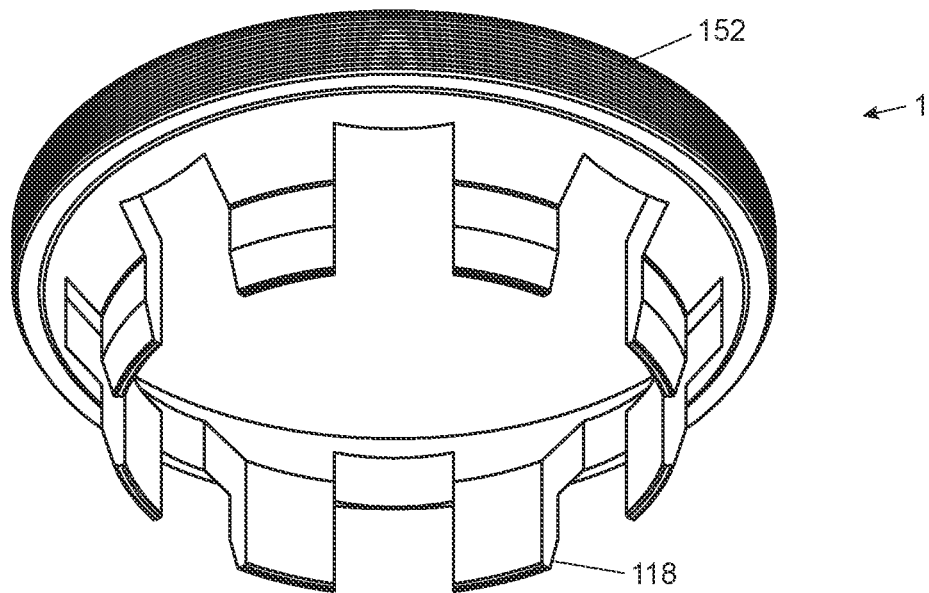
FIG. 6 is generally a perspective view of a tang body portion of a connector in accordance with a preferred embodiment of the current invention.

Referring now to FIG. 6, a perspective view of tang body 152 showing the tang portions 118 is shown.

Figure 7:
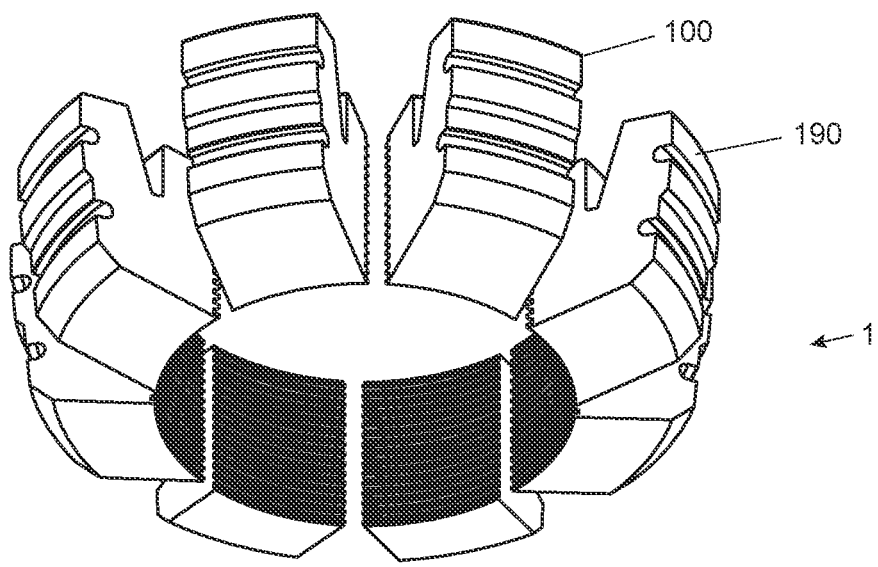
FIG. 7 is generally a perspective view of a group of segment dogs in accordance with a preferred embodiment of the current invention.

Referring now to FIG. 7, a ring of dog segments 190 is shown as a group of eight dog segments 100.

Figure 8:
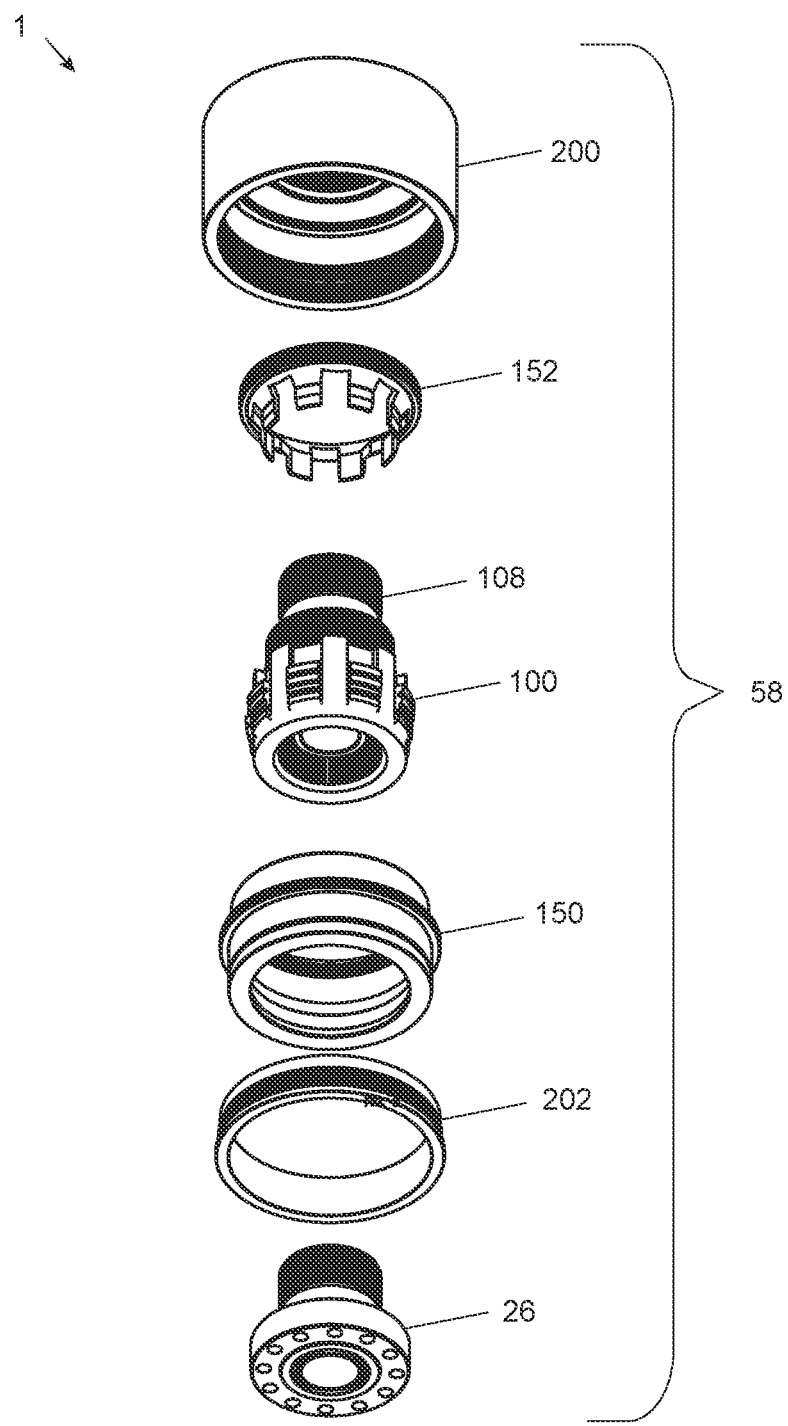
FIG. 8 is generally an exploded view of the main component of the connector in accordance with a preferred embodiment of the current invention.
Figures 9A, 9B, 9C, 9D:
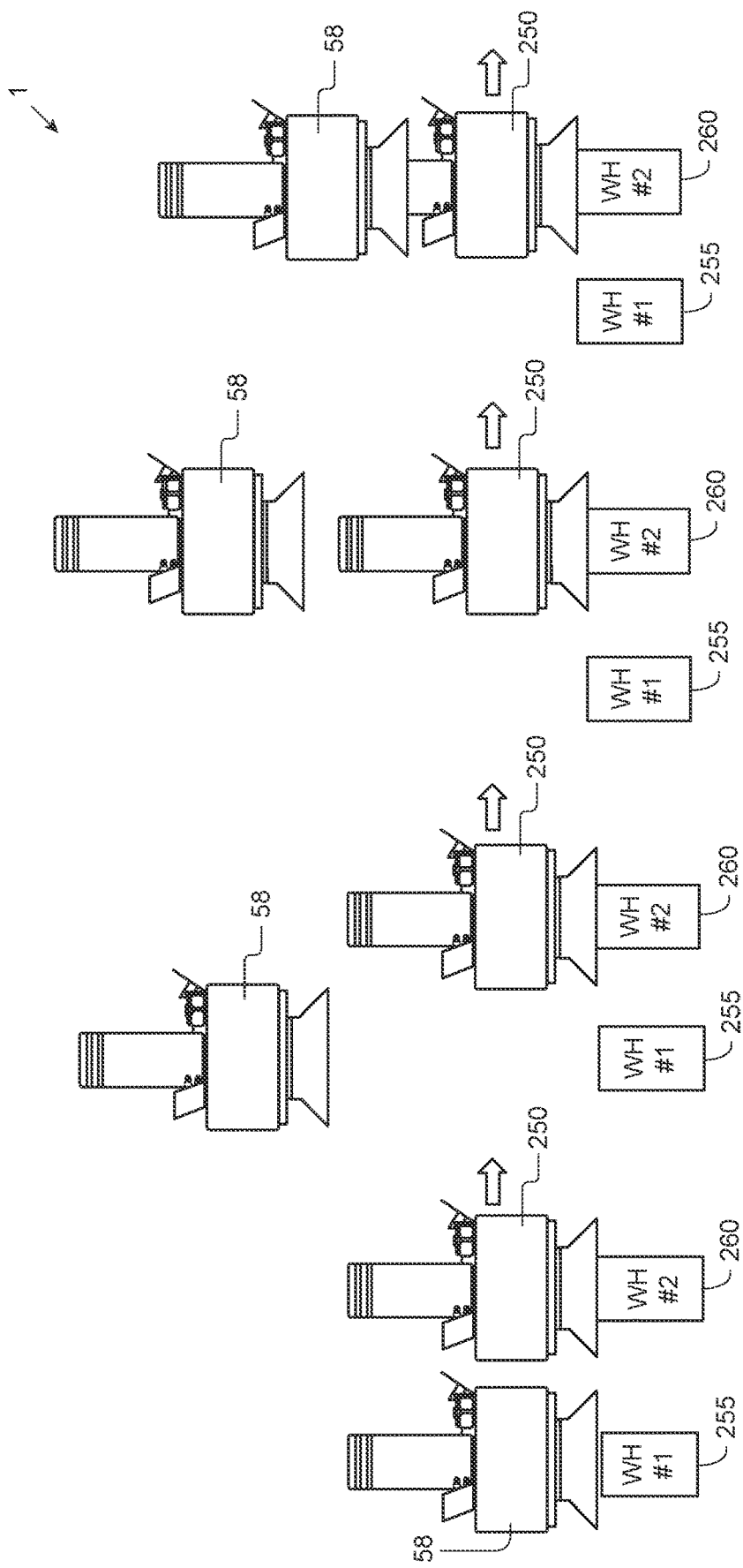
FIG. 9A is generally an illustration of another preferred embodiment in accordance with the current invention showing the steps of an operation and or method.
FIG. 9B is generally an illustration of another preferred embodiment in accordance with the current invention showing the steps of an operation and or method.
FIG. 9C is generally an illustration of another preferred embodiment in accordance with the current invention showing the steps of an operation and or method.
FIG. 9D is generally an illustration of another preferred embodiment in accordance with the current invention showing the steps of an operation and or method.
Figure 11:
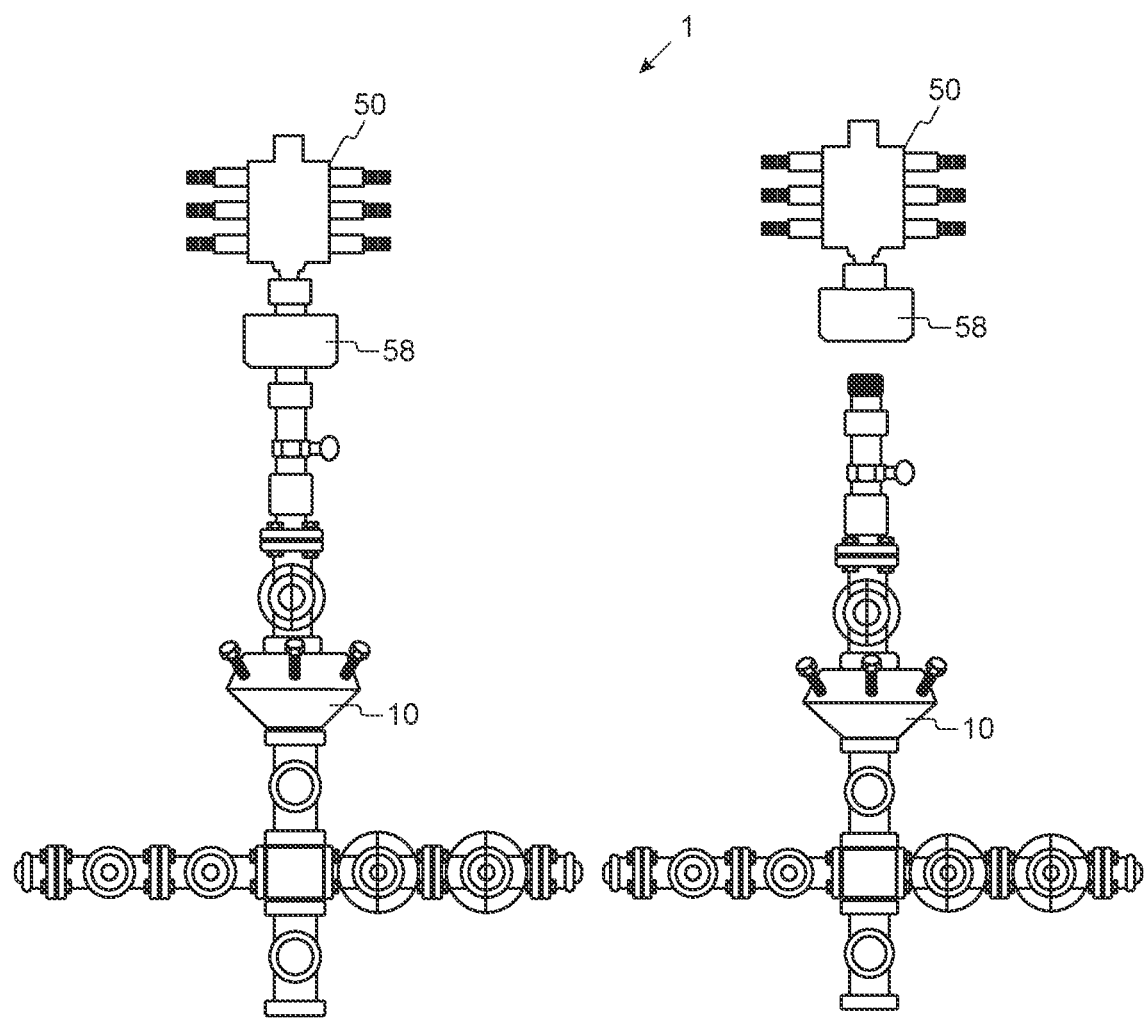
FIG. 11 is generally an illustration of another preferred embodiment in accordance with the current invention.

Referring now to FIG. 8, a perspective exploded view of the connector 58 is shown with outer body 200, tang body 152, main body 108, dog segments 100, piston 150, gland 202, and top sub 26.

It is also understood that the spring load said one or more segments moves towards the engaged position; that the reverse angle may allow full engagement when engagement starts; may include lock over center characteristic; may be hydraulic, mechanical, and or air pressure; threads may be Acme, V, and or generic; may include a remote and or manual activation.

Another Preferred Embodiment

Referring now to the figures and more in particular to FIGS. 9A-9D, 10A-10D, 11, 12A and 12B, invention 1 may include blind connector and or night cap 250 that may be connector 58 having a seal 300. It is understood that connector 58 may or may not have a through port, completely drilled annulus, plug inserted, a cap attached, and so forth to create seal and or plug 300 at the top of connector 58.

This may allow invention 1 to be utilized in fracking operations, where there is a need for a quick connection during repetitive operations. Associated with repeating perforating and the associated moving of the service tool package 50 such as a wireline BOP. It is desirable to provide seal and or plug 300 which provides a blind connector and or night cap 250 to the top of the frack tree on the top of the well when the wireline BOP is not connected.

As generally depicted, well one 255 and may have connector 58 with wireline bop service tool package 50 above (not depicted) and well two 260 may have night cap 250. Through steps 9A through 10D, well one 255 now has the night cap 250 and well two 260 has the wireline bop service tool package 50 and all remotely done without an individual having to manually unscrew/screw and disconnect/connect.

Funnel Down Attachment and or Approach

Invention 1 further contemplates funnel down attachment 120 to connector 58 and or blind connector 250. Funnel down attachment 120 may be but is not limited to being made of metal and bolted to connector 58 and or blind connector 250. It is understood that funnel down attachment 120 may be made from other materials and attached in various methods. It is also understood that funnel down attachment 120 may be incorporated into connector 58 and or blind connector 250.

Funnel down attachment 120 may essentially provide a guide for positioning while attaching equipment to the well. In the prior art, it is known to provide a "funnel up" approach which requires all wells on the well pad to include a connector. The current invention 1 "funnel down" approach moves the connector 58 and or blind connector 250 from wellhead to wellhead with the on-site crane and removes the need for each wellhead to include a connector. This will allow only one connector required on-site in some instances. This may provide a savings in cost and or time where a well site may include numerous wells on the one pad.

Ball Drop

Figure 14:
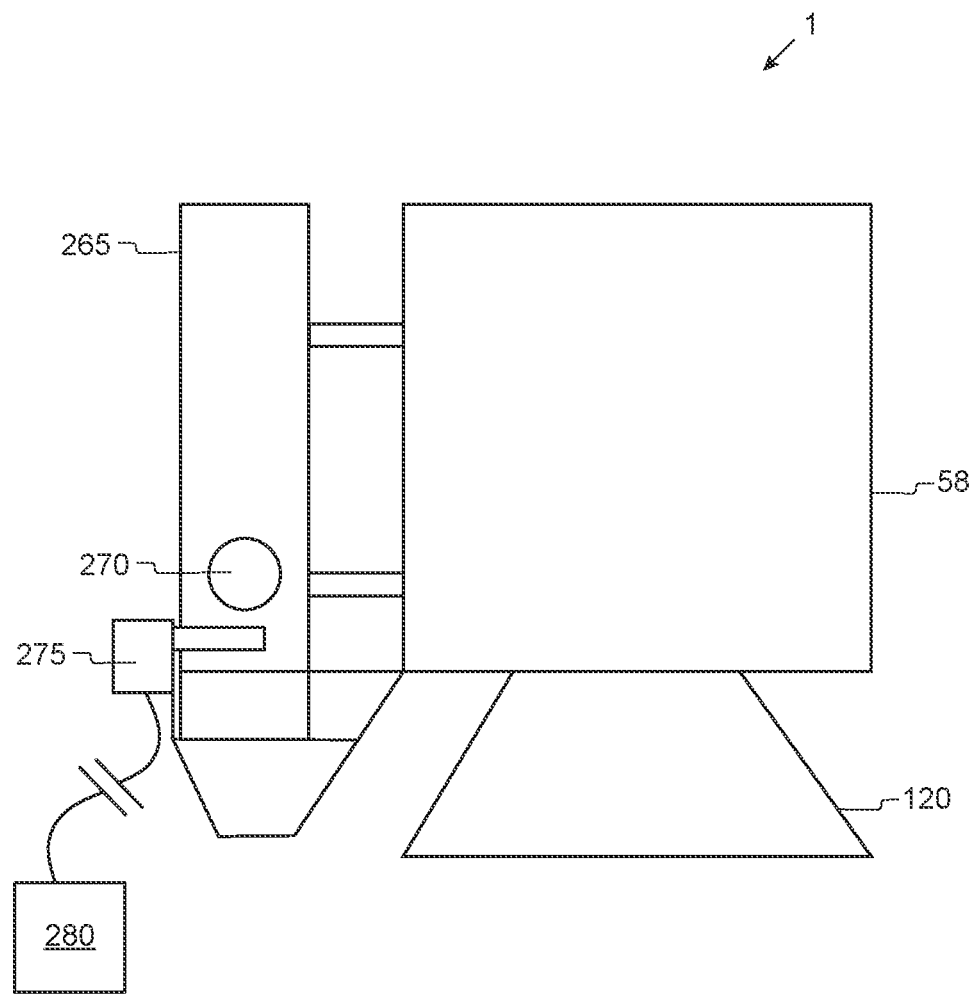
FIG. 14 is generally an illustration of another preferred embodiment in accordance with the current invention with a remotely activated ball drop.

Now referring to FIG. 14, it is still further contemplated to provide a ball drop system 265 that may comprise a one or more ball 270, remotely operated drop cylinder 275, a remote control 280, and so forth. It is known in some well operations such as but not limited to fracking operations, that ball 270 may be required to be dropped in the wellhead 14 at every stage and or during an operation. A means to drop the ball 270 remotely is desirable. Blind connector 250 and or connector 58 may include ball drop system 265 that allows the connector 58 and or blind connector 250 to be removed, moved slightly, and inserting ball drop system for the release of one or more ball 270, then reattaching connector 58 and or blind connector 250.

Sensors and Indicators

Invention 1 may include visual indicators 285 as shown generally in FIG. 12A and which may be dropped downward generally out of view when top sub 26 enters into connector 58 dogs segments 100 drop into position as depicted in FIG. 12B.

Figure 15:
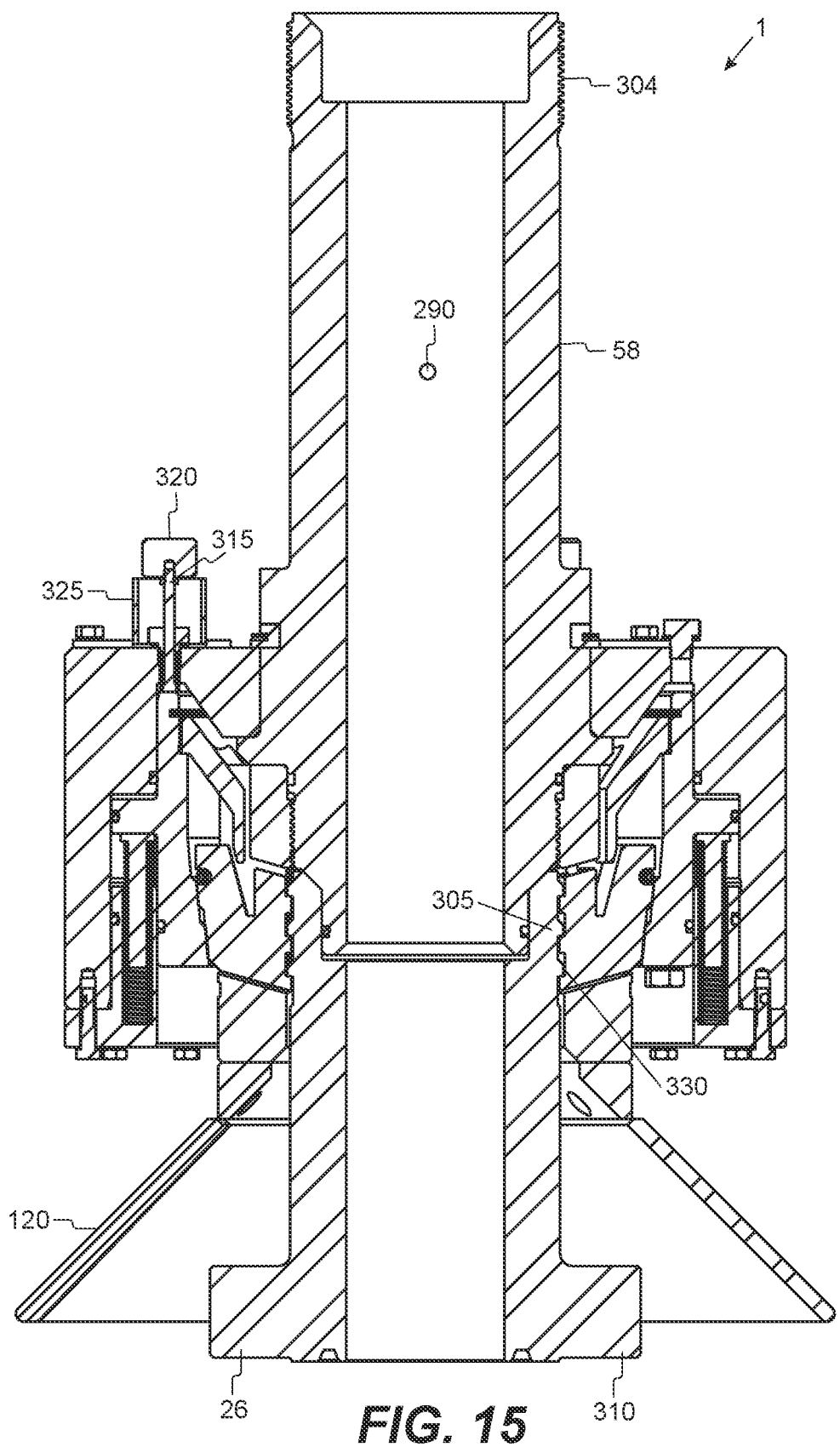
FIG. 15 is generally an illustration of another preferred embodiment in accordance with the current invention showing a cross section.
Figure 16:
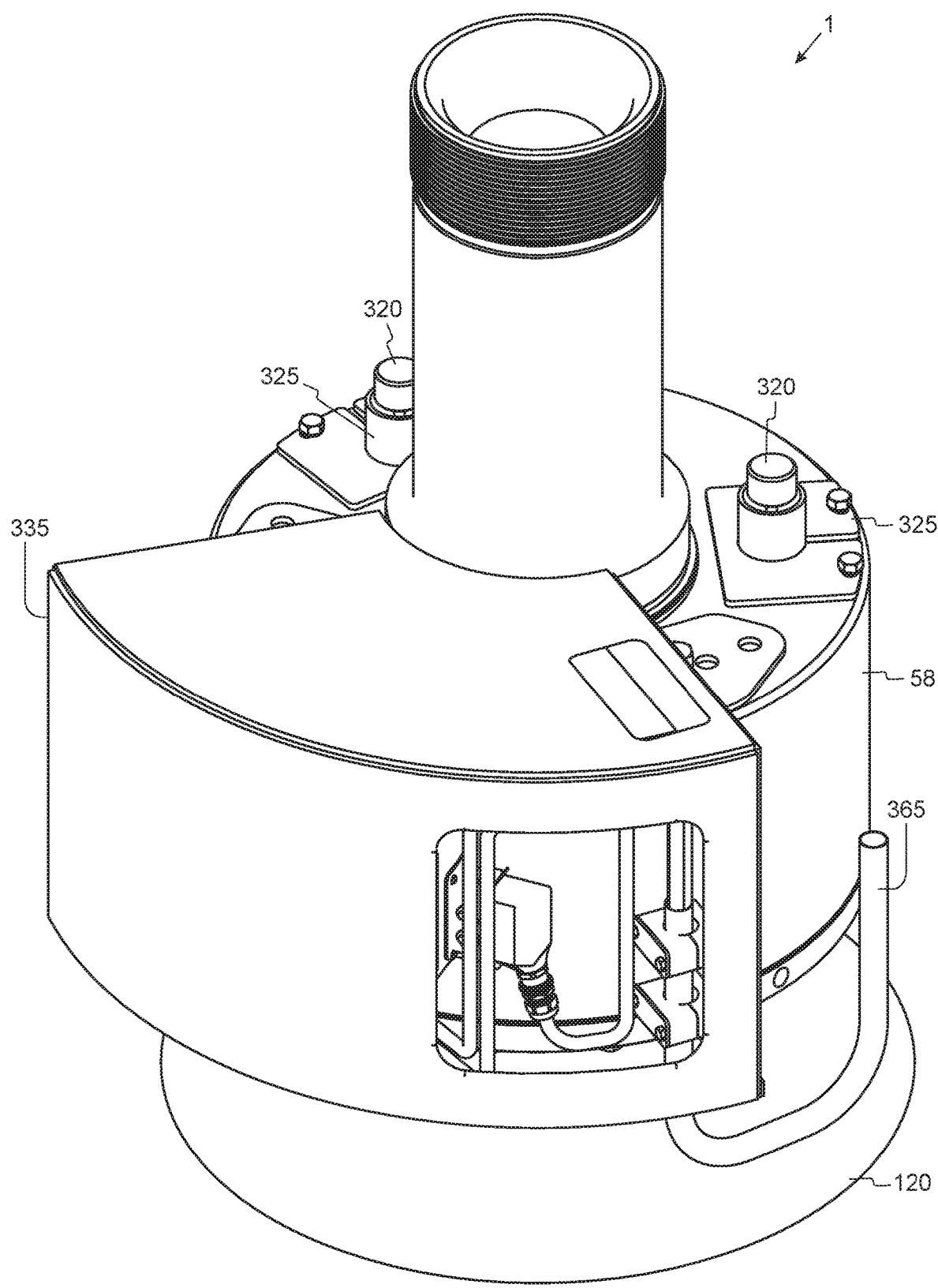
FIG. 16 is generally an illustration of another preferred embodiment in accordance with the current invention with a guard box.
Figure 17:
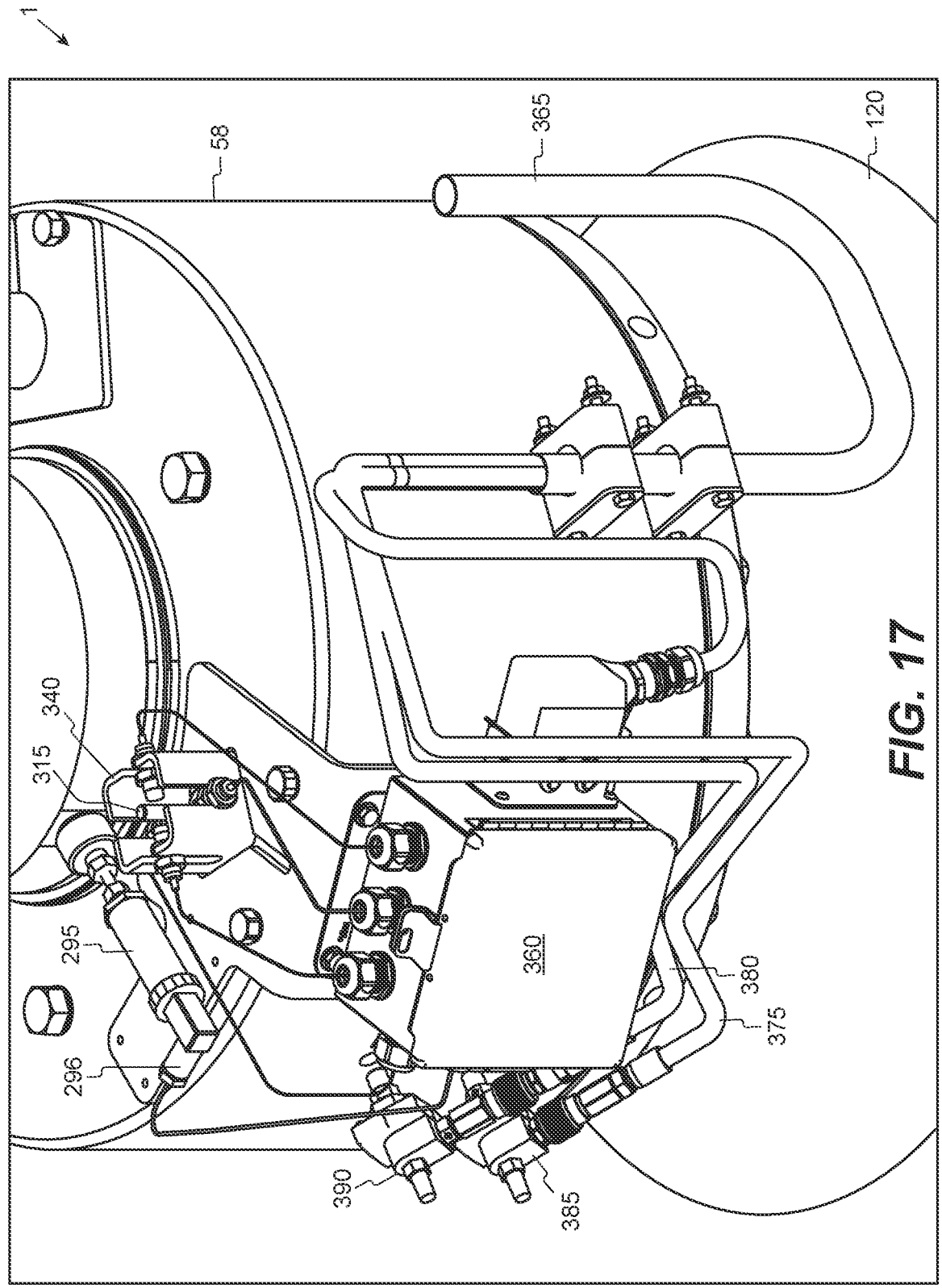
FIG. 17 is generally an illustration of another preferred embodiment in accordance with the current invention without a guard box of the embodiment in FIG. 16.
Figure 18:
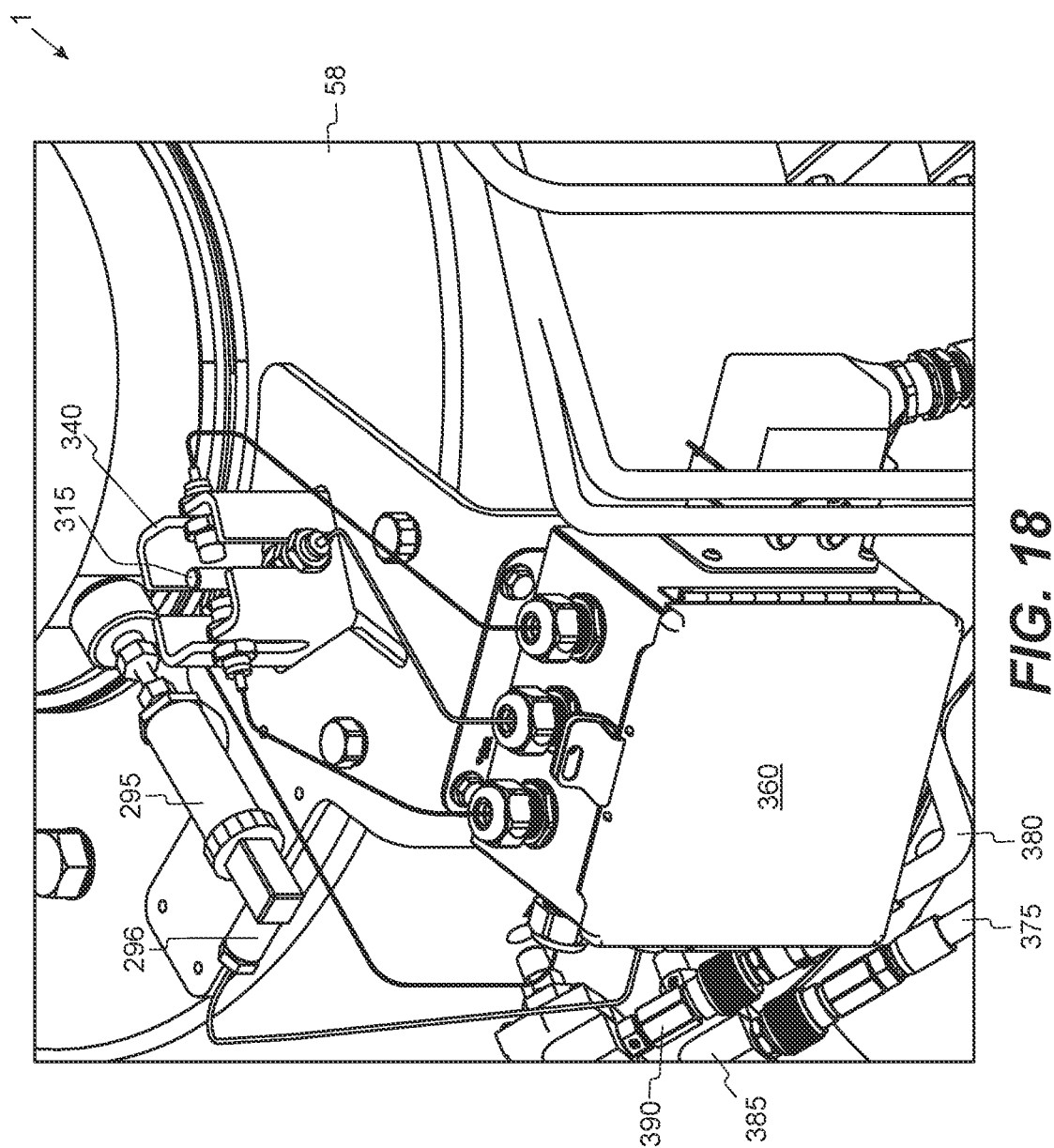
FIG. 18 is generally an illustration of another preferred embodiment in accordance with the current invention without a guard box of the embodiment in FIG. 16.

Now referring to FIGS. 15 through 20, in another preferred embodiment, connector 58 may have a port hole and or aperture 290 for locating end of the port hole where the bore pressure reading is taken inside connector 58 and or blind connector 250 with pressure transducer 295, seen on FIG. 17 and FIG. 18. The invention may include a bore pressure system 296 that may allow monitoring of the bore pressure and may be displayed and used to prevent disconnecting the connector 58 and or blind connector 250 if bore pressure is present.

FIG. 15 generally illustrates a full cross sectional view of the with a profile version of three flanges and associated grooves. The top 304 of the connector 58 may be an API 6A standard top connection (9-4 ACME thread) and top 305 of top sub 26 has the profile cross section on top, with a standard API top connector sealing surface and a standard API flange on a bottom 310.

Connector 58 may include a mechanical lock indicator 315 may have a puck 320 and sleeve 325 wherein puck 320 and sleeve 325 may hide and or protect lock indicator 315 when the system is unlocked. The depiction is in the locked position, though unpressurized as the dog segments 100 and wellhead 14 are not touching yet. Invention 1 is designed to be modular, so that dog segments 100 and adapters can easily be changed out to different dogs that may have different profiles. The depiction is of three section profile 330 to correspond with profile on top sub 26.

Figure 19:
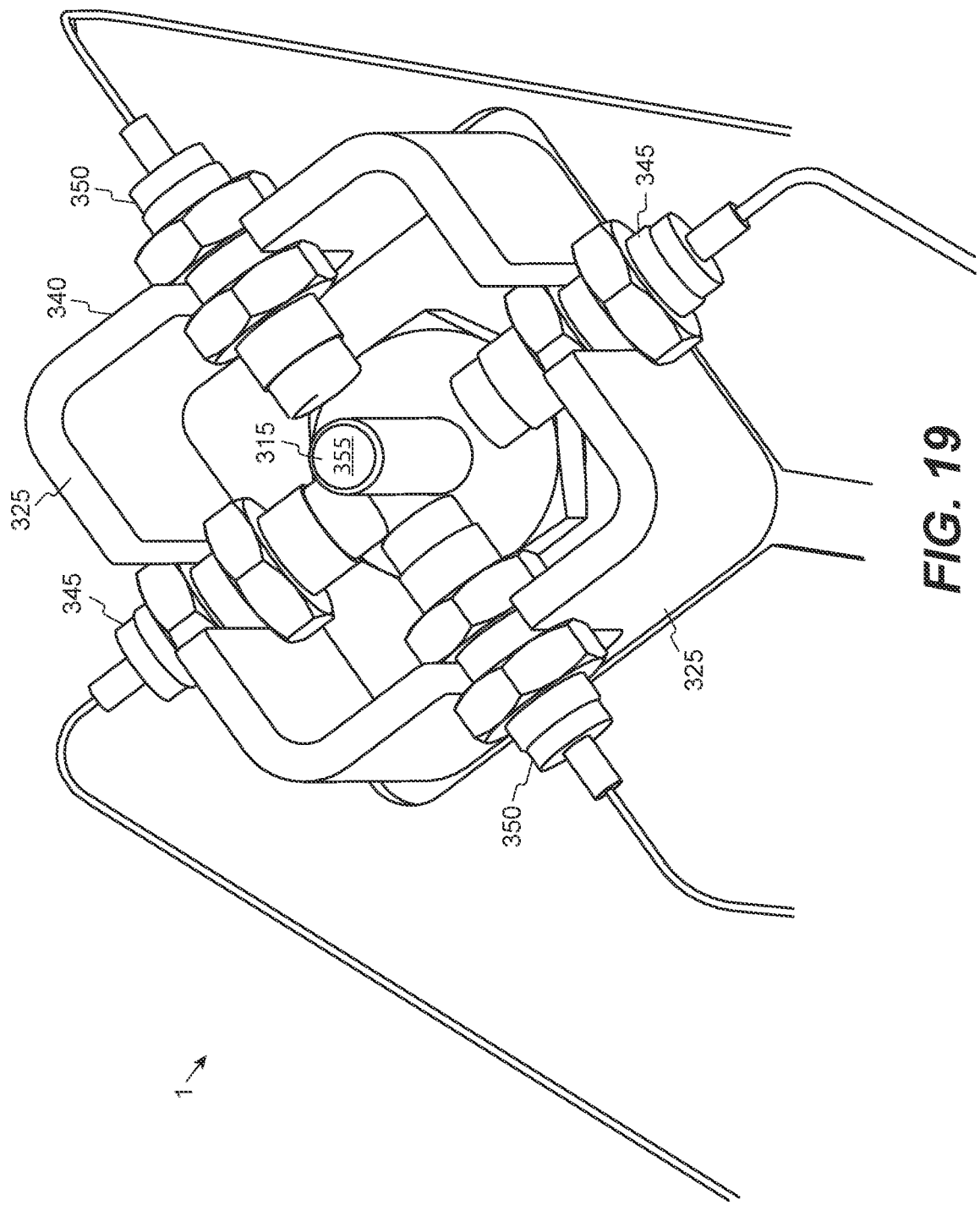
FIG. 19 is generally an illustration of another preferred embodiment in accordance with the current invention depicting an indicator position system.
Figure 20:
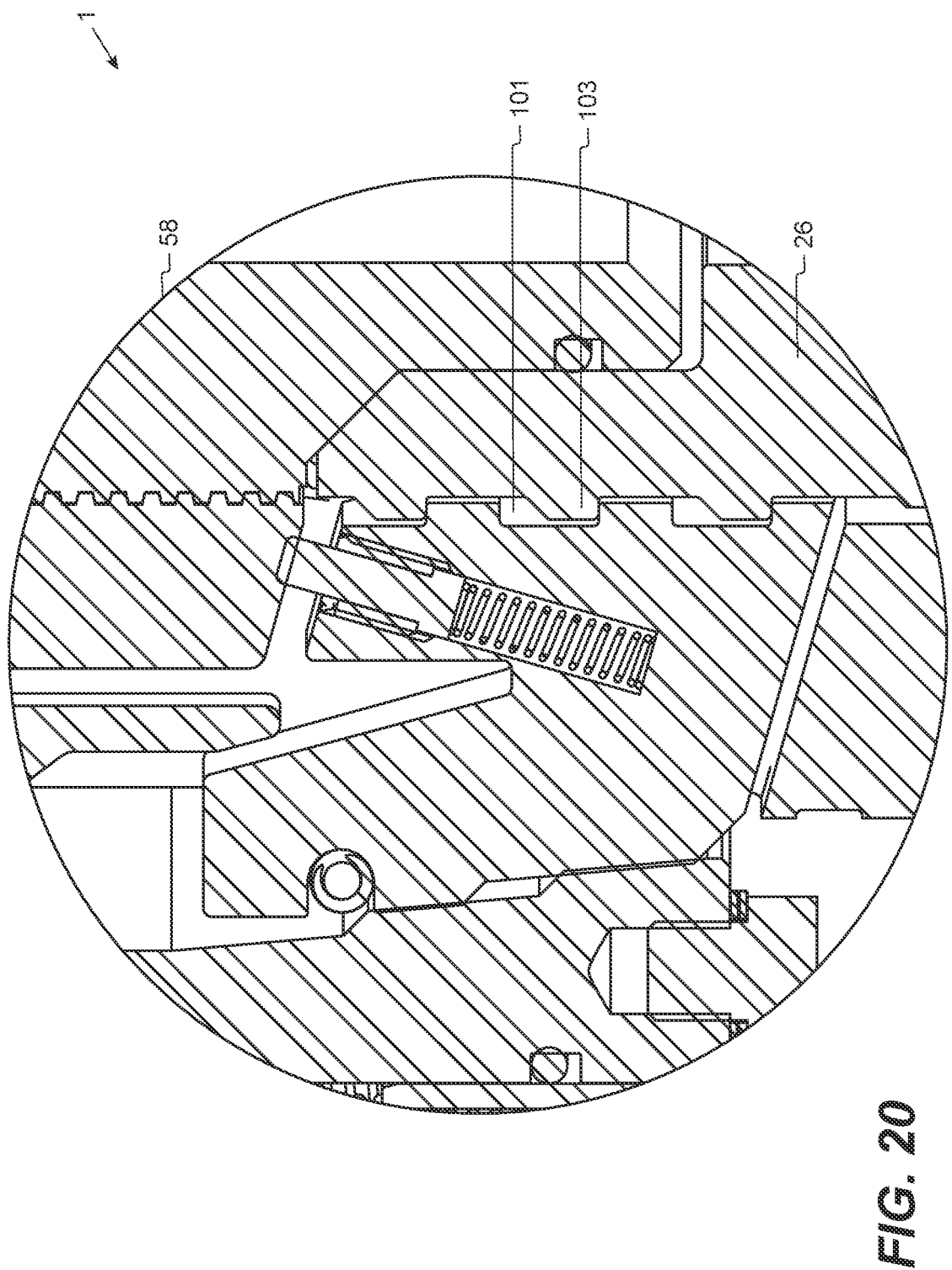
FIG. 20 is generally an illustration of another preferred embodiment in accordance with the current invention showing a cross section with a non-threaded profile.

FIG. 16 generally depicts a connector 58 with a guard box 335. It is understood that some of the elements described are potentially damaged by operations and it may be desirable to cover certain elements. FIG. 17, FIG. 18, and FIG. 19 generally show what would be beneath guard box 335.

FIG. 19 generally depicts lock indicator 315 position system 340 which may include two proximity switches 345, one of the two for redundancy, tell whether indicator 315 is down and thus the system is locked. Two proximity switches 345 will be set such that indicator 315 will be below the two proximity switches 345. Two proximity switches 350, one of the two for redundancy, tell if indicator 315 is up and thus the system unlocked. Two proximity switches 350 will be set such that indicator 315 will be approximately level or higher with top 355 of indicator 315.

Figure 13:
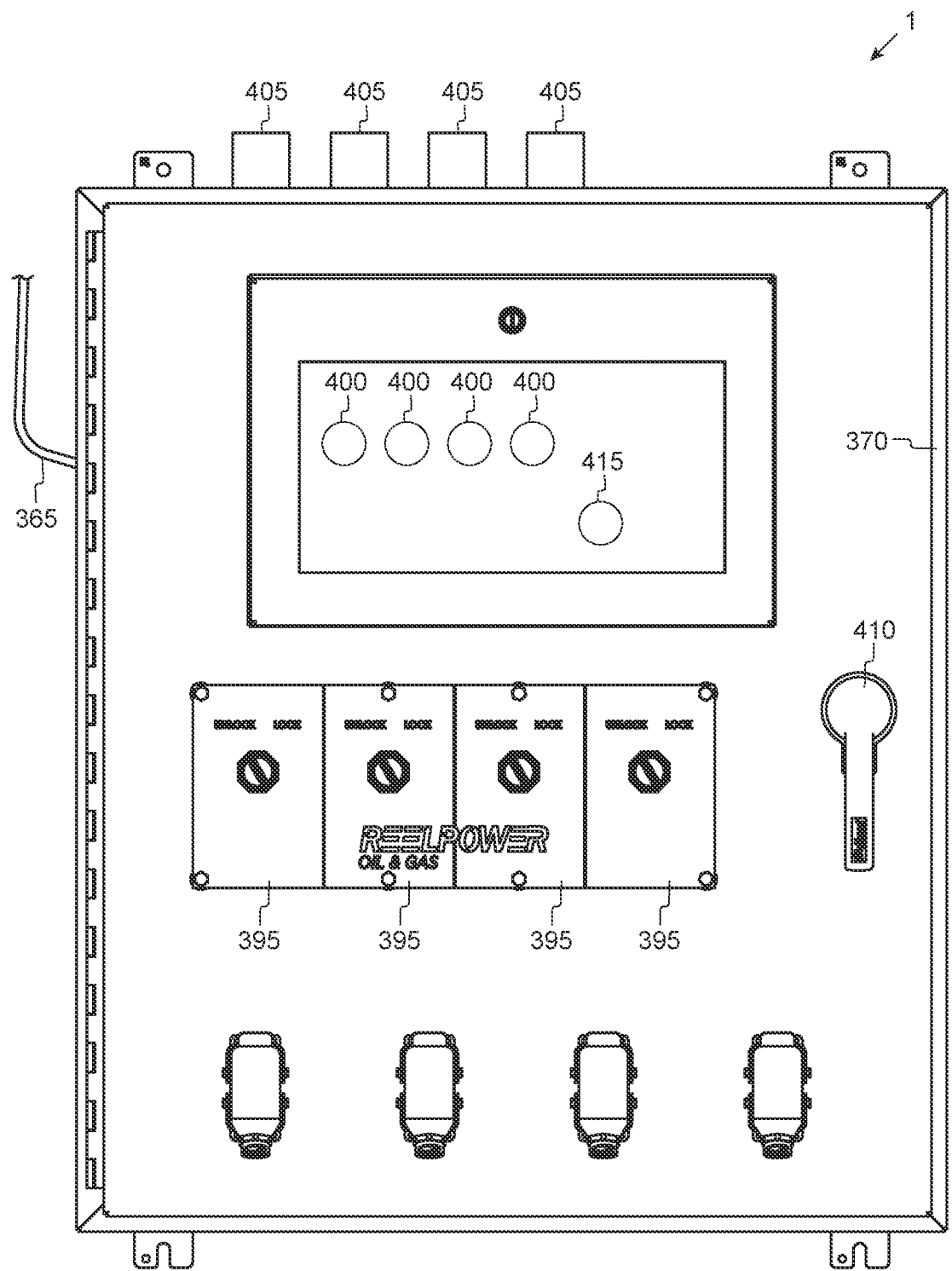
FIG. 13 is generally an illustration of another preferred embodiment in accordance with the current invention depicting a control panel and or skid.

Indicator 315 position system 340 and bore pressure system 296 may be electrical and draw from box 360 and be powered by umbilical 365 which connects to transmit the information to the control skid 370 (FIG. 13).

Air hose line 375 and 380 are the air hoses to control the actuation of connector 58 and may be two quick disconnect connectors, ordered such that the lines 375 and 380 cannot be confused and plugged in to wrong ports 385 and 390 respectively, insuring a "lock" command will actually lock the system and not unlock it. The may also utilize umbilical 365 to communicate with control skid 370. Umbilical 365 may be clamped to guard 335 to prevent forces on the connections themselves, and can be routed up through the top of the guard box 335 to allow bundling with the lubricator, BOP, or other cables (for the connector on the crane) or down through the bottom for the ones used as night caps 250.

Referring to FIG. 13, invention 1 may be utilized with multiple connector 58 and or night cap 250 at the same time. The current embodiment shows four, but it is understood that more or less may be utilized. Activation switches 395 may activate the system to open lock and unlock connector 58 and or night cap 250, have a corresponding bore pressure read out 400, and corresponding visual indicator 405 for showing corresponding lock or unlocked. Corresponding bore pressure read out 400 will indicate if the system may be unlocked if the pressure is below a set level and will show and or prevent unlocking if the pressure is too high. Control skid 370 may have a manual on/off switch 410 and system air pressure gauge display 415.

It is also contemplated to provide a control interlock for blind connector 250 and or connector 58. This may include a pressure sensing device with interlocks to prevent inadvertent or on purpose actuation causing a release of the connector if bore pressure is present.

It is therefore contemplated that the current invention 1 may be a method of connecting a connecting member to a male profile member, comprising: providing at least two segments with a female profile; holding said at least two segments out of engagement from said male profile member while engaging said connecting member with said male profile member; releasing said at least two segments to allow engagement with said male profile member; moving said at least two segments axially of said male profile member to allow said female profile of said at least two segments to engage said male profile member; causing said threads of said at least two segments to engage said male profile member; and securing said at least two segments in the engaged position thereby connecting said connecting member to said male profile member to create a seal, and wherein said female profile of said at least two segments and said male profile member are threaded and adapted to mate to create a seal, wherein said female profile of said at least two segments has at least one groove and said male profile member at least one flange wherein said at least one groove and said at least one flange are adapted to mate to create a seal.

The particular embodiments disclosed above are illustrative only, as the invention may be modified and practiced in different but equivalent manners apparent to those skilled in the art having the benefit of the teachings herein. Changes may be made in the combinations, operations, and arrangements of the various parts and elements described herein without departing from the spirit and scope of the invention. Furthermore, names, titles, headings and general division of the aforementioned are provided for convenience and therefore, should not be considered limiting.

What is claimed is:

1. A method of connecting a connecting member to a male profile member, comprising:
   providing one or more dog segments with a female profile;
   holding said one or more dog segments out of engagement from said male profile member while engaging said connecting member with said male profile member;
   releasing said one or more dog segments to allow engagement with said male profile member;
   moving said one or more dog segments axially of said male profile member to allow said female profile of said one or more dog segments to engage said male profile member;
   causing threads of said one or more dog segments to engage said male profile member;
   securing said one or more dog segments in an engaged position with said connecting member thereby connecting said connecting member to said male profile member to create a seal;
   wherein said one or more dog segments sit on an inclined shoulder of a window of a main body of said connecting member;
   wherein said inclined shoulder has an angle which is greater than an engagement angle of threads on said male profile member; and
   wherein said female profile of said one or more dog segments and said male profile member are flat top threads.

* * * * *